United States Patent [19]

Trussler et al.

[11] Patent Number: 4,556,826

[45] Date of Patent: Dec. 3, 1985

[54] INCHING SUPPLY TORQUE CONTROL

[75] Inventors: Ronald C. Trussler, Peterborough; Andrew C. Stevenson, Bailieboro; Peter D. Eastcott, Peterborough, all of Canada

[73] Assignee: Canadian General Electric Company Limited, Toronto, Canada

[21] Appl. No.: 643,303

[22] Filed: Aug. 22, 1984

Related U.S. Application Data

[63] Continuation-in-part of Ser. No. 556,907, Dec. 1, 1983, abandoned, which is a continuation-in-part of Ser. No. 470,443, Feb. 28, 1983, abandoned.

[30] Foreign Application Priority Data

Feb. 4, 1983 [CA] Canada .................................... 420981

[51] Int. Cl.[4] .......................... H02P 1/56; H02P 7/747
[52] U.S. Cl. ......................................... 318/92; 318/85; 318/94; 318/98; 318/101; 318/104; 318/110
[58] Field of Search ....................... 318/85, 92, 94, 95, 318/98, 99, 100, 101, 104, 105, 106, 107, 108, 109, 110, 112, 443, 444

[56] References Cited

U.S. PATENT DOCUMENTS

| | | | |
|---|---|---|---|
| 2,304,355 | 12/1942 | Haynes | 318/94 |
| 4,298,831 | 11/1981 | Espelage et al. | 318/112 |
| 4,491,767 | 1/1985 | Eastcott et al. | 318/85 |

Primary Examiner—B. Dobeck
Assistant Examiner—Bentsu Ro
Attorney, Agent, or Firm—Raymond A. Eckersley

[57] ABSTRACT

In a drive system for a grinding mill the load torque plus frictional torque may increase considerably as a loaded mill is inched from its rest position and will suddenly decrease when the load tumbles or cascades. The applied torque or driving torque must increase at a corresponding rate and should also decrease when the load cascades. If the applied torque exceeds by a significant amount the load torque plus frictional torque, a destructive hammering will occur in the gear train and this will be generally proportional to the excess of applied torque for a synchronous motor drive. The drive system has a DC source which is commutated by a commutating device to provide a low frequency stepped alternating voltage to the stator windings of the synchronous motors of the drive system for inching. The output of the DC source has an alternating current component which varies as the difference between the applied torque and the load torque plus frictional torque. The alternating current component is detected and a control signal is derived from the alternating current component and used to regulate the DC source to reduce the alternating current component and thereby cause the applied torque to approach the sum of load plus friction torques.

7 Claims, 12 Drawing Figures

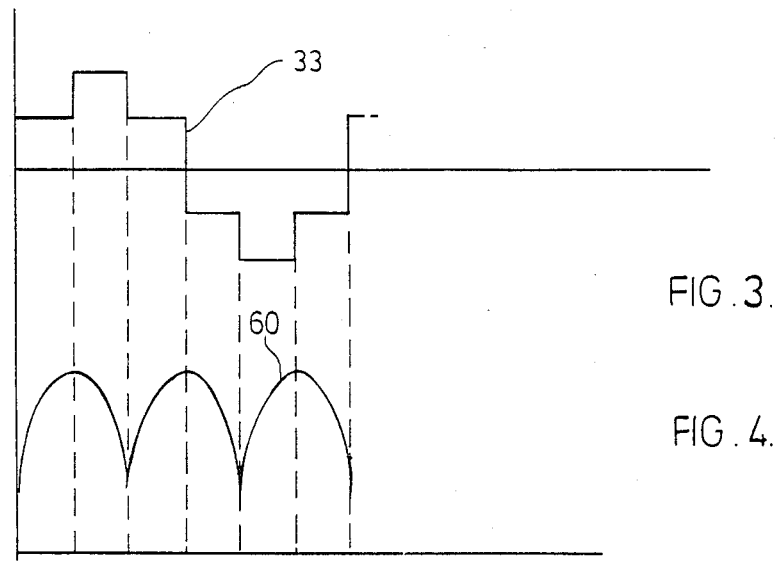
FIG. 3.
FIG. 4.
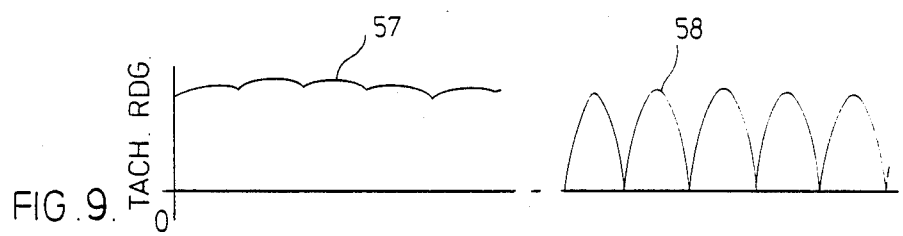
FIG. 9.
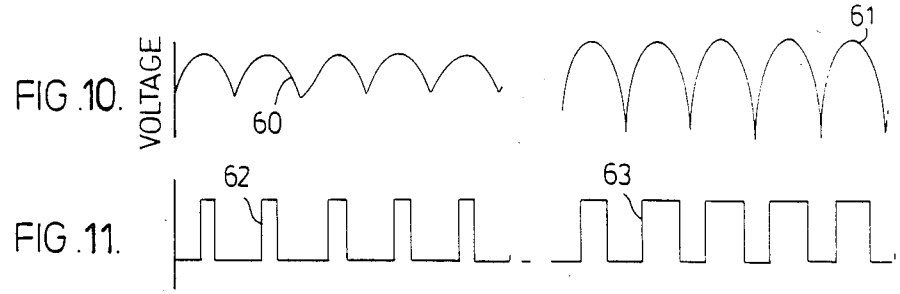
FIG. 10.
FIG. 11.
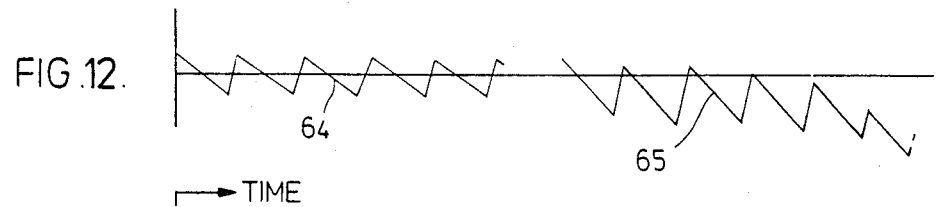
FIG. 12.

INCHING SUPPLY TORQUE CONTROL

CROSS REFERENCE

This application is a continuation-in-part of application Ser. No. 556,907, filed Dec. 1, 1983, which is a continuation-in-part of application Ser. No. 470,443 filed Feb. 28, 1983, both now abandoned.

BACKGROUND OF THE INVENTION

The present invention relates to a drive system having one or more synchronous motors driving a common load, and in particular it relates to a power supply and control for electric inching of one or more three phase synchronous motors driving a grinding mill.

When a grinding mill is driven by synchronous motors, the running speed is fixed unless the motors are connected to a variable frequency power source. It is frequently desirable to run the grinding mill at speeds considerably slower than the normal running speed, for example, to inspect the mill liners when the mill is empty or to start the mill after it has been stopped with a full charge. This slow running is often referred to as inching or spotting.

Inching has been accomplished in several ways. One way involves the use of clutches. If the motors are coupled to the mill through clutches, the clutches may be partially engaged to cause rotation of the mill at lower speeds. This partial clutch closure for long periods generates considerable heat in the clutches and requires that wet clutches be installed and provision made to dissipate the heat generated. An installation using wet clutches is more expensive than one using dry clutches. Another way to provide for inching uses a removable hydraulic motor which is placed to engage the main mill pinion gears. This is inconvenient and requires a separate hydraulic motor. A third way to provide for inching uses a low frequency power source to provide power to the stator windings of the three phase synchronous drive motors. The low frequency power source may be a direct current (DC) supply connected to an inching supply bus for the motors through a series of electro-mechanical or static switches to produce stepped low frequency three phase voltages. These switches are referred to as sequencing or commutating switches. If there are a number of grinding mills at one location, only one such supply is required and it can be switched to a particular mill as desired. The present invention is concerned with this last way of providing inching.

Technical Information bulletin GET-1722C, E.A.E. Rich, entitled "Spotting Equipment for Synchronous Motors", published November 1966 by the General Electric Company, describes in some detail the inching or spotting of synchronous motors using a direct current supply and a pair of switches or contactors for each phase winding can be connected to the positive side of the supply, to the negative side of the supply, or not connected. By sequencing the switches in a predetermined manner, a magnetic field is created by the stator windings which slowly rotates or steps causing the rotor to rotate in steps. Reference to this bulletin will provide further detail of this way of providing inching. The textbook "Power Semiconductor Circuits" by S. B. Dewan and A. Straughen, 1975, a Wiley-Interscience Publication (ISBN 0-471-21180-X) about page 425 shows a stepped voltage waveform that can be obtained from a converter.

When a mill is being inched with no load or ball charge in the mill, for example, to inspect the mill liners, then the torque required is relatively constant and the torque is less than required for normal running. When a loaded mill is being inched, the rotation begins from a rest position where the charge is at the bottom. The torque initially required to begin rotation is relatively small. As the mill is rotated or inched to the cascade position where the charge starts to tumble, the torque required increases quite considerably as the charge is moved away from the rest position on a large radius. The cascade position may be around 40 to 50 mechanical degrees although it is sometimes greater. Once the charge begins to tumble the required load torque drops. It will be seen that it is very desirable to have some control over the developed torque.

If the developed motor torque matches the load torque plus the friction torque, then the rotation will be continuous and smooth. If the developed torque is not sufficient the rotor will slip poles. If the developed torque is much larger than the load torque required, the rotor will try to move at excessive speeds to the next position, i.e., it will jump to the next position, causing vibration and placing considerable strain on the gear teeth coupling the motor to the mill. This strain can result from several situations or conditions during inching.

For example, when a DC supply is commutated by switching to develop a low frequency stepped alternating supply for the stator (at perhaps, for example, one hundredth of the normal operating frequency) to inch the motor, the stator supply becomes a succession of discrete steps approximating a low frequency sinusoidal waveform. The torque developed by the motor results from the slowly rotating stator field interacting with the rotor field. Thus the rotor tends to advance in discrete steps. If the developed torque is much larger than the load torque plus the friction torque, the rotor will jump to, and oscillate about, each new position as the field rotates in steps and this will cause severe vibration and "hammering" of the gears. It is difficult to avoid the vibration and the resulting strain on the gears, as during inching the load torque increases from a relatively low level as the mill leaves its rest position to a relatively high level just before the cascade position. It is difficult to match the developed torque to the changing load torque. Copending U.S. application Ser. No. 556,906 (continuation-in-part of Ser. No. 448,316 now abandoned)—Eastcott et al filed Dec. 1, 1983 and assigned to Canadian General Electric Company Limited, describes one way of reducing and controlling this vibration.

Another example of a situation which can provide gear strain occurs when the load in the mill tumbles and the load torque is suddenly reduced. If the developed motor torque remains at the same level there will be vibration and hammering as the inching continues.

Referring for the moment to FIG. 1, there is shown a graph of reference voltage plotted against mill rotation as might appear when inching a load such as a loaded grinding mill. The graph would also represent torque plotted against mill rotation as the torque is approximately proportional to the voltage. The load torque is represented by curve 1. As the mill begins to rotate there is an initial torque required to overcome friction and start the rotation of the mill. The torque requirement then decreases slightly, then begins to increase as the mill rotates and raises the load which had settled at the bottom when the mill was stopped. The torque continues to increase as the load is rotated farther away from the bottom position it had when the mill was stopped. When the load in the mill cascades (about point 2 on the curve) the torque requirement decreases until a substantially steady state is reached.

In the past it has been known to provide a manually adjustable reference for the DC supply. An operator could set the voltage required to provide a maximum torque as required by mill cascade conditions. This is represented by the broken line 3 in FIG. 1. This reference could not follow changing conditions, although it was adequate for an experienced operator when inching an empty mill.

Subsequently an improvement was devised where the reference controlling the DC level was ramped up to a maximum to approximate increasing load torque as a loaded mill was inched from rest position to cascade position. This is represented by curve 4 in FIG. 1. It will be apparent that the sloped portion or ramp portion of curve 4 must reach the steady or constant level before maximum load is reached, that is before the load is expected to cascade. Depending on the gear ratios and the motors, this ramp portion might be associated with, for example, a time of two to three minutes after inching is started. As the load in a mill cannot in practice be determined with sufficient accuracy before inching, and as the cascade position varies, it is difficult to provide an accurate ramped reference and to reduce that reference as soon as the load tumbles. The aforementioned U.S. application Ser. No. 556,906 reduces vibration by detecting the vibration with a sensor and reducing stator voltage to hold the vibration to an acceptable minimum. While this provides simple and adequate control, the response is sometimes not able to compensate rapidly enough for sudden changes in torque. The curve 5 in FIG. 1 represents the torque provided according to the invention where the ramped reference 4 is reduced by the control of this invention to provide torque in accordance with curve 5.

SUMMARY OF THE INVENTION

The present invention matches the inching torque to the required load torque over a wide range of loading situations without requiring externally mounted devices. The control of the present invention senses an AC component of the commutated DC applied to the stators of the synchronous motors. The AC component varies with excess motor torque developed and is used to control the developed torque to provide a drive that runs smoothly with relatively little or no vibration during inching.

It is therefore an object of the invention to provide an improved torque control for inching a synchronous motor.

It is another object of the invention to provide a low frequency supply for inching synchronous motors where the level is automatically controlled to reduce vibration.

Accordingly there is provided an electrical control for inching a drive system having a load driven by at least one three phase synchronous motor, each synchronous motor having a stator and a rotor, each stator having stator windings and each rotor having a field winding, comprising means for applying direct current excitation to the field winding on the rotor of each said synchronous motor, a controllable source of direct current, commutating means receiving from said controllable source of direct current a supply of direct current power and providing low frequency stepped alternating current to the different phases of the stator winding of each synchronous motor for inching the motor, the direct current provided by said controllable source of direct current having a superposed alternating component with a frequency related to the steps in the low frequency stepped alternating current and which increases in amplitude as the applied motor torque exceeds the load torque plus frictional torque, means for determining the level of the alternating component and for providing a control signal representing the determined level, and means for applying said control signal to said controllable source of direct current to reduce the alternating component whereby the applied motor torque decreases to approach the load torque plus frictional torque required.

BRIEF DESCRIPTION OF THE DRAWINGS

The invention will be described in more detail with reference to the accompanying drawings, in which FIG. 3 is a graph of voltage versus time used to show an example of a stepped waveform, FIG. 4 is a graph of voltage versus time showing a waveform representing an example of an alternating component related to the waveform of FIG. 3, FIGS. 5-8 are graphs of voltage versus time, each Figure having an (a) and a (b) graph, the waveforms in the (a) graphs representing alternating components of various amplitudes, and the corresponding waveforms in the (b) graphs representing resulting pulses, and FIGS. 9-12 are graphs plotted against time showing waveforms useful in describing the operation of the invention.

DETAILED DESCRIPTION

Figure 2:
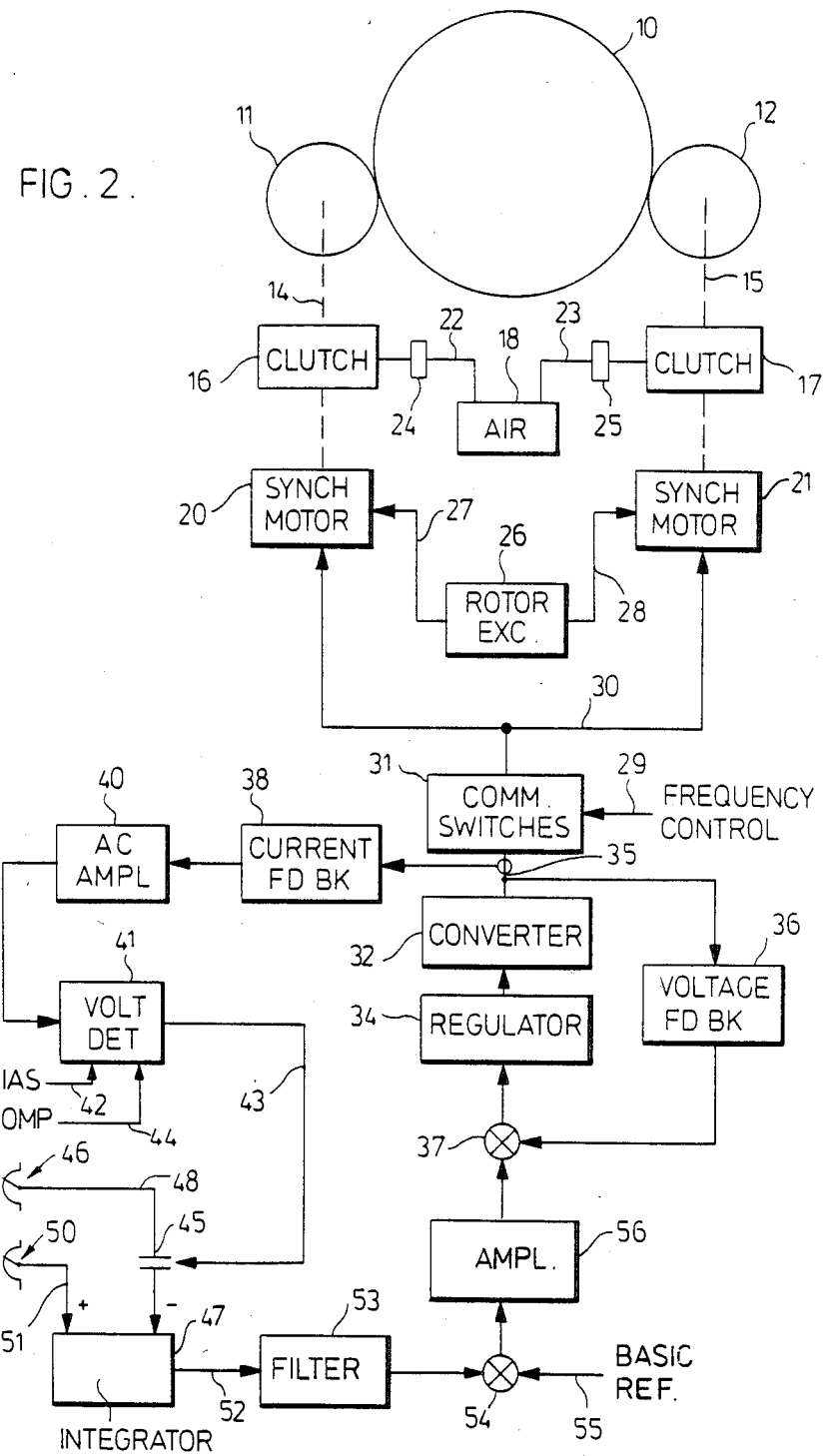
FIG. 2 is a simplified block schematic diagram of a grinding mill having a controlled low frequency supply for inching.

Referring to FIG. 2, a large ring gear or bull gear 10 is represented schematically. This ring gear is of a type mounted on a large grinding mill. Two pinions or driving gears 11 and 12, also represented schematically, are in continuous meshing relationship with gear 10. It should be understood that although the gear teeth are not shown on gears 10, 11 and 12, they have teeth that mesh or engage so that the gears 11 and 12 can be driven to rotate gear 10 and thus rotate the mill. The shafts 14 and 15 respectively connect the pinions 11 and 12 through fluid actuated dry clutches 16 and 17 to three phase synchronous motors 20 and 21. The working fluid which operates the clutches 16 and 17 is preferably air provided by air supply 18 over lines 22 and 23. Solenoid valves 24 and 25 are operated electrically to control the air to clutches 16 and 17.

The synchronous motors 20 and 21 have a rotor excitation supply 26 which provides to the field windings on the respective rotors over conductors 27 and 28 a DC excitation in the normal manner. An inching bus 30 is connected to the stator windings of synchronous motors 20 and 21 when inching is required. It will be understood that the normal alternating power from a power system is applied to the stator for normal running and that the inching bus 30 is only connected to replace the normal stator supply when inching is required.

The inching bus 30 carries a stepped DC voltage which simulates a low frequency sinusoidal waveform. A converter 32 provides a controllable level of DC power over conductor 35 to sequencing or commutating switches 31. The switches 31 operate in a predetermined sequence to switch the DC power in a manner which provides the stepped DC voltage on bus 30. The converter 32 may be any standard form of converter, for example a thyristor converter, however any source of direct current power that can be controlled would be suitable. Any controllable rectifier means would be suitable instead of converter 32, alternately a rotating source of direct current could be used if the output was controllable. Because low frequency sinusoidal AC power is not easy to obtain, it has long been the practice to provide the rotating magnetic field in the synchronous motor by using switches (which may be solid state switches) or contactors, two for each phase winding, to connect in a predetermined sequence each phase winding to the positive or to the negative side of the direct current supply, or to leave a phase disconnected, in order to provide a rotating magnetic field which steps around the stator by a predetermined amount each time the switches operate. This is described in detail in the aforementioned booklet "Spotting Equipment for Synchronous Motors". The commutating switches operate to form a low frequency alternating supply that might, for example, have a waveform similar to waveform 33 in FIG. 3. The waveform 33 represents a voltage developed by a minimum of sequencing or commutating switches. It is a simple simulation of a sinusoidal waveform. An increased number of switches and a rearrangement of switching sequence can provide an increased number of steps which will simulate a sinusoidal waveform more accurately. It has been found that an alternating current component is created at the output of converter 32 that has a relationship with the operation of commutating switches 31. Waveform 60 in FIG. 4 represents the alternating current component as it might appear under certain conditions. That is, waveform 60 is a representation of voltage plotted against time, obtained by inserting a small resistance in conductor 35 and determining the voltage across the resistance. The voltage is proportional to current in conductor 35 and therefore waveform 60 is representative of current at the output of converter 32. While the voltage was determined, it is current that is of primary interest and this representation of current was obtained in an accepted manner by using voltage drop. The waveform 60 is shown in FIG. 4 superimposed on a DC component. This alternating current component, which is present on conductor 35, is related to torque. The alternating current component referred to here is not ripple in the output of converter 32. The invention would operate if the direct current was supplied by a DC generator rather than converter 32. This alternating current component is a result of interaction between the synchronous motor being inched and the system providing power to the motors.

Still referring to FIG. 2, the frequency of stepped alternating voltage is controlled by a signal input at 29. The converter 32 is regulated or controlled by a regulator 34 with voltage feedback. A voltage signal is derived from conductor 35 at the output of converter 32, and may be amplified or scaled at voltage feedback scaler 36 and applied to an adder or summing point 37.

The voltage feedback circuit may be an optional circuit. It is used to feed a stabilizing signal back if the operation requires it. Summing point 37 provides a point to add the stabilizing signal (if provided) and the control signal together.

The current output of converter 32 is sensed at conductor 35 and scaled at current feedback scaler 38. The resulting signal which represents the current level and the aforementioned alternating current component, is applied to AC amplifier 40. The output of amplifier 40 contains only the AC component (i.e. alternating current component) of the signal representing converter current. The output of amplifier 40 is applied to a biased voltage detector 41. The voltage detector 41 provides output pulses whose width is proportional to the AC component beyond the bias level. When the amplitude of the AC component is less than a certain level, set by the signal at bias input 42, the pulse output of voltage detector 41 is substantially zero. A compensating signal is applied at input 44 to adjust the net bias for different levels of averaged load torque, thus discriminating between light loads and heavy loads. The output of voltage detector 41 is on conductor 43 and this output, which is a variable width pulse output, is applied to open and close a switch 45. The switch 45, when closed, connects an adjustable source of negative voltage 46 to an integrator 47 via conductor 48. The integrator 47 is connected to an adjustable source of positive voltage 50 via conductor 51. Thus, the integrator 47 receives an input on conductor 51 that is constant and an opposite input on conductor 48 when switch 45 is closed. The integrator integrates these inputs and provides a signal on conductor 52 representing the integrated value. This signal is applied to a filter circuit 53 which converts the signal into a relatively smooth control signal, and applies this to adding point 54.

As was previously mentioned, it is known to provide a basic reference to increase the voltage (to increase the torque), for example, as the load in a mill is inched from a rest position. Such a basic ramped reference is shown as curve 4 in FIG. 1 and may be applied to summing point 54 at input 55. The input from filter 53 will modify the input at 55 to increase it or decrease it as required and will rapidly decrease it when the load in the mill cascades. The output from summing point 54 is amplified by amplifier 56 and applied to summing point 37 to control regulator 34 as previously described.

Figure 5:
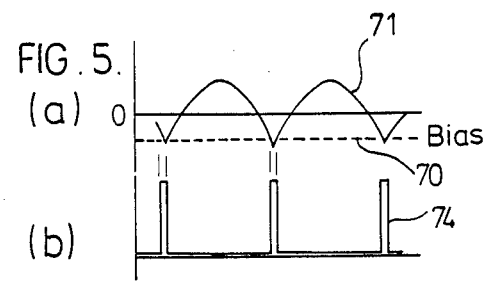
Figure 6:
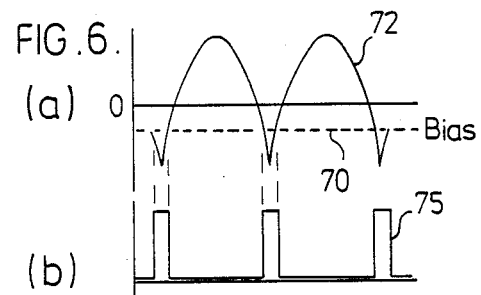
Figure 7:
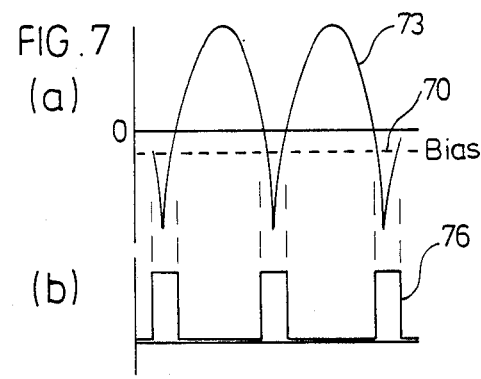

Referring now to FIGS. 5, 6 and 7, there is shown in FIGS. 5(a), 6(a) and 7(a) a representation of the alternating current component signal (i.e. the AC component) that is the output of amplifier 40 (FIG. 2) for increasing magnitudes of the signal. The bias, as applied at bias input 42 (FIG. 2) is indicated by broken line 70. The alternating current component waveform 71 in FIG. 5(a) represents a low magnitude signal and just extends below bias line 70. The alternating current component waveform 72 in FIG. 6(a) is of greater amplitude and extends farther below the bias line 70. Again the alternating current component waveform 73 in FIG. 7(a) extends even farther below the bias line 70. The portion of waveforms 71, 72 and 73 which extend below bias line 70 cause voltage detector 41 (FIG. 2) to output on conductor 43 (FIG. 2) a pulse output 74, 75 and 76 respectively whose pulse widths correspond to the width of waveforms 71, 72 and 73 below the bias line 70.

Figure 8:
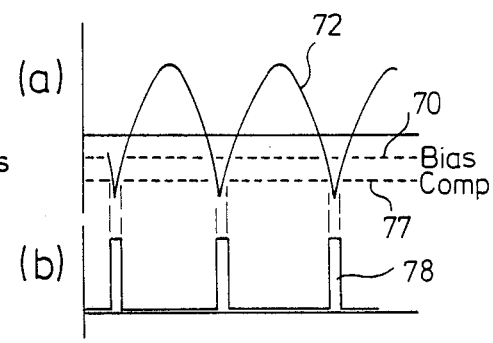

Referring to FIG. 8, there is shown in FIG. 8(a) a waveform 72 representing the alternating current component with bias line 70 and compensation 77 as applied by inputs 42 and 44 (FIG. 2) respectively to voltage detector 41 (FIG. 2). It will be seen that the compensating signal alters the effective level of the bias, and the altered level defines the level below which the waveform 72 causes the generation of the pulses of pulse train 78 of FIG. 8(b). In other words, the compensating signal at input 44 (FIG. 2) adjusts the bias level upwardly and downwardly to adapt for lighter and heavier loads. Lighter loads may require somewhat less bias because the lighter load, during inching, steps from one position to the next more quickly and hence tends to oscillate at each position more readily than a heavier load. If the bias level is set for a lighter load, for example at line 70 in FIG. 8, the compensating signal may be used to add algebraically to the bias level to effectively increase the bias level (negatively, as seen in FIG. 8) to line 77 for heavier loads.

Figure 1:
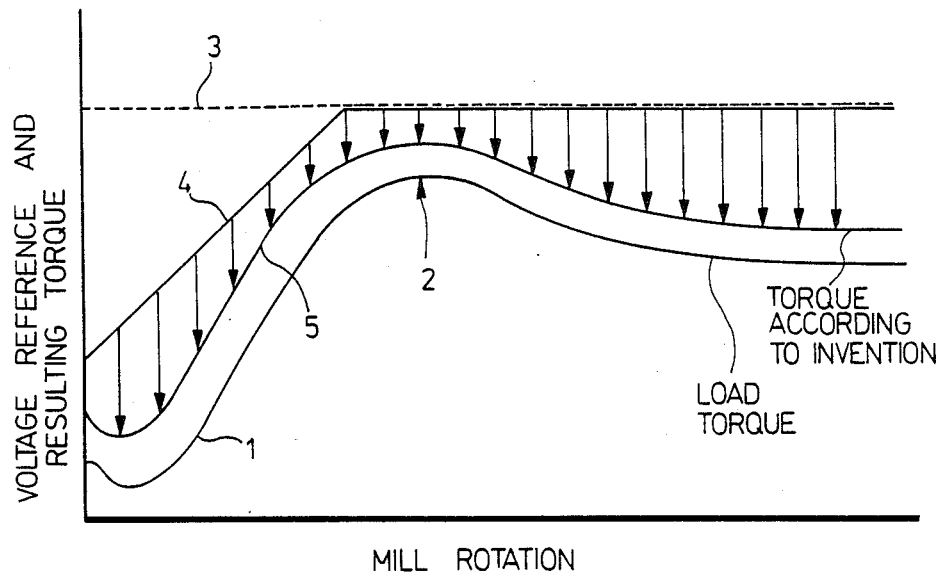
FIG. 1 is a graph useful in describing the invention with respect to prior art.

Referring now to FIG. 9, there is shown by way of example, a tachometer reading (RPM) plotted against time for a condition represented by waveform 57 where the applied torque is equal to the load torque plus friction, and for a condition represented by waveform 58 where the applied torque is in excess of the load torque plus friction. It will be seen that the waveform 57 shows a substantially steady rotation in spite of the stepped waveform (as described and shown in FIG. 3). If this applied torque can be maintained substantially equal to and not less than the load torque and friction as the changes occur, then the inching rotation will be smooth and little strain will be placed on the drive gearing. There should be a small excess of applied torque as indicated in FIG. 1. On the other hand, waveform 58 shows a condition where rotation falls to zero or stops between each step and this represents a hammering condition which puts considerable strain on the drive gearing. It is desirable to detect and stop the condition represented by waveform 58 and return to or at least approach and maintain a condition as represented by waveform 57.

It should be explained that the waveforms in FIGS. 9–12 represent two conditions: one condition (on the left side in each Figure) represents a condition where the control of the present invention operates to substantially maintain a balance between applied torque and load torque plus frictional torque, and the other condition (on the right side of each Figure) where the control was temporarily disabled in an inching procedure to obtain an excess of applied torque thereby providing the waveforms on the right side which cause gear hammering.

It was previously mentioned that the frequency of the stepped waveform used for inching was of the order of one hundredth of the running frequency or line frequency (this frequency is 60 Hz in North America). Thus the frequency of the stepped waveform is conveniently 0.6 Hz which is a period of about 1.6 seconds. Thus each cycle of the alternating component shown by waveform 60 (FIG. 4) would have a time frame of 1.6/3 = 0.53 seconds.

Referring now to FIG. 10, there is shown a waveform 60 which represents the AC component, such as would appear at the output of AC amplifier 40 (FIG. 2) under conditions where the applied torque substantially balances the load torque plus friction. The waveform 61 represents the AC component such as would appear at the output of amplifier 40 (FIG. 2) under a condition where the applied torque did not equal load torque plus friction but rather exceeded it by a considerable amount.

Referring to FIG. 11, there is shown a waveform 62 such as would appear at the output of voltage detector 41 (FIG. 2) under conditions where the applied torque approximately equalled the load torque plus friction. Similarly waveform 63 represents the output of voltage detector 41 (FIG. 2) under conditions when the applied torque did not equal load torque plus friction but exceeded it.

Referring now to FIG. 12, there is shown a waveform 64 such as would appear at the input of filter circuit 53 (FIG. 2) under conditions where the applied torque substantially balanced load torque plus friction. The waveform 65 represents the condition at the same place for an unbalanced condition where switch 45 (FIG. 2) is closed for longer periods applying a negative voltage to integrator 47 for longer periods, causing the output of integrator 47 to become more negative as shown.

Very simply, as soon as the AC component of the current increases (and the AC component increases when, for example, applied torque exceeds the load torque plus friction) and uneven rotation results, a signal is provided by filter circuit 53 to adding point 54 to reduce the basic reference which controls regulator 34. This reduces the level of DC current that is commutated by commutating switches 31. In turn this reduces the level or amplitude of low frequency commutated current on inching bus 30 so that the torques approach a balance condition and the AC component reduces to a predetermined level.

As was previously mentioned, it is possible to increase the number of commutating or sequencing switches (switches 31 in FIG. 2) and arrange their switching to provide a stepped waveform 33 (FIG. 3) with more steps. This will help to provide a smoother rotation and will change the number of cycles of AC component per cycle of stepped waveform.

It will be seen that a second converter could be used instead of commutating switches 31 if desired. Other alterations and changes will be apparent to those skilled in the art.

What we claim as new and desired to secure by Letters Patent of the United States of America is:

1. An electrical control for inching a drive system having a load driven by at least one three-phase synchronous motor, each synchronous motor having a stator and a rotor, each stator having stator windings and each rotor having field windings, comprising
   means for applying direct current excitation to the field winding on said rotor of each said synchronous motor,
   a controllable source of direct current,
   commutating means receiving from said controllable source of direct current a supply of direct current power and providing low frequency stepped alternating current power to the stator winding of each said synchronous motor for inching the motor,
   the direct current power provided by said controllable source of direct current having an alternating current component which increases as the applied motor torque exceeds the load torque plus frictional torque,
   means for determining the level of the alternating current component and for providing a control signal representing the determined level, means for applying said control signal to said controllable source of direct current to reduce the level thereof whereby the applied motor torque decreases to approach the load torque plus frictional torque required and said alternating current component reduces.

2. An electrical control according to claim 1 in which said commutating means is commutating switches.

3. An electrical control according to claim 1 in which said means for determining the level of the alternating current component and for providing a control signal representing the determined level, comprises an amplifier which receives a signal representing the current output of said controllable source of direct current including said alternating current component and provides an amplified signal representing said alternating current component thereof, a voltage detector responsive to said amplified signal representing said alternating current component to provide a pulse train, the pulse width of the pulses in said pulse train being related to the amplitude of said alternating current component, switch means responsive to said pulses in said pulse train to switch to a closed position for the duration of each pulse to apply a voltage to an integrator when in said closed position, the integrated value being related to the amount of said alternating current component, means receiving the integrated value from said integrator to provide said control signal.

4. An electrical control according to claim 3 in which said means for applying said control signal to said controllable source of direct current comprises a reference signal source providing a reference signal which increases at a rate at least sufficient to increase applied motor torque as rapidly as estimated load torque increase during inching of said motors, summing means for receiving said reference signal and said control signal from said means receiving said integrated value and providing a difference signal, means for applying said difference signal to said controllable source of direct current to control the output thereof.

5. Apparatus for controlling the inching of a drive system for a grinding mill, the drive system including at least two three-phase synchronous motors connected to the mill through gearing, the motors each having a rotor and a stator, the rotors having a rotor field winding and the stators having a three-phase stator winding, comprising means for applying direct current excitation to each said rotor field winding, a controllable rectifier means for receiving alternating current from a power source and providing a controlled direct current output, commutating means connected to said controllable rectifier means to receive said controlled direct current output and to provide a low frequency stepped alternating current for inching, means for connecting said commutating means to said stator windings to apply said low frequency stepped alternating current to different phase windings in a predetermined sequence for inching said motors, the direct current output of said controllable rectifier means having an alternating current component related to the steps in said stepped alternating current and which increases as the applied motor torque exceeds the load torque plus frictional torque, a current sensor for sensing the current output of said controllable rectifier means including said alternating current component and providing a current feedback signal representing the current output, alternating current amplifier means for receiving said current feedback signal and providing an amplified signal representing the alternating current component of said current output, detector means for receiving said amplified signal and having an adjustable threshold for providing a pulse train when the amplitude of said amplified signal exceeds said threshold, said pulse train having a pulse width which varies as the amplitude of said alternating current component, switch means having an open and a closed condition and responsive to each pulse for changing to said closed position for the duration of said pulse, integrator means connected to a negative supply through said switch means and to a positive restoring bias to provide an output signal whose value varies as said alternating current component, means responsive to the output signal from said integrator means to provide a first control signal which is related to said alternating current component, a reference source providing a basic reference signal which increases at a rate sufficient to increase applied motor torque at least as rapidly as the load torque is estimated to increase during inching, summing means for receiving said first control signal and said basic reference signal and providing a difference signal representing a second control signal, regulator means for receiving said second control signal and responsive thereto for controlling said controllable rectifier means to reduce said alternating current component and thereby cause the applied motor torque to approach the load motor torque plus frictional torque.

6. Apparatus according to claim 5 in which said controllable rectifier means is a converter.

7. Apparatus according to claim 5 in which said commutating means is a plurality of commutating switches.

* * * * *